(12) United States Patent
Sasaki

(10) Patent No.: US 8,665,568 B2
(45) Date of Patent: Mar. 4, 2014

(54) MAGNETIC SENSOR

(75) Inventor: Tomoyuki Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 857 days.

(21) Appl. No.: 12/471,804

(22) Filed: May 26, 2009

(65) Prior Publication Data

US 2010/0007995 A1 Jan. 14, 2010

(30) Foreign Application Priority Data

Jul. 9, 2008 (JP) ................................ 2008-179471

(51) Int. Cl.
*G11B 5/33* (2006.01)
*G11B 5/127* (2006.01)

(52) U.S. Cl.
CPC . *G11B 5/33* (2013.01); *G11B 5/127* (2013.01)
USPC .................. 360/319; 360/324.11; 360/324.12

(58) Field of Classification Search
None
See application file for complete search history.

(56) References Cited

U.S. PATENT DOCUMENTS

| | | | |
|---|---|---|---|
| 7,209,328 B2 * | 4/2007 | Ito et al. ..................... | 360/324.2 |
| 7,253,995 B2 | 8/2007 | Takahashi et al. | |
| 7,280,322 B2 | 10/2007 | Takahashi et al. | |
| 7,298,597 B2 | 11/2007 | Carey et al. | |
| 7,349,186 B2 | 3/2008 | Ito | |
| 7,492,631 B1 * | 2/2009 | Assefa et al. ................. | 365/171 |
| 7,522,392 B2 | 4/2009 | Carey et al. | |
| 7,598,578 B2 | 10/2009 | Nakamura et al. | |
| 7,678,475 B2 | 3/2010 | Slavin et al. | |
| 7,755,928 B2 | 7/2010 | Anezaki et al. | |
| 7,755,929 B2 * | 7/2010 | Inomata et al. ............... | 365/158 |
| 8,085,513 B2 | 12/2011 | Sasaki | |
| 8,238,064 B2 | 8/2012 | Yamada et al. | |
| 8,339,750 B2 * | 12/2012 | Sasaki ........................... | 360/319 |

| | | | |
|---|---|---|---|
| 2005/0111138 A1 | 5/2005 | Yamakawa et al. | |
| 2006/0262458 A1 * | 11/2006 | Carey et al. ................. | 360/324.2 |
| 2007/0127162 A1 | 6/2007 | Nishiyama et al. | |
| 2007/0253116 A1 * | 11/2007 | Takahashi ..................... | 360/313 |
| 2007/0253121 A1 | 11/2007 | Yamada et al. | |

FOREIGN PATENT DOCUMENTS

| | | |
|---|---|---|
| EP | 1 052 520 B1 | 11/2000 |
| JP | A-2000-323767 | 11/2000 |
| JP | A-2003-008105 | 1/2003 |

(Continued)

OTHER PUBLICATIONS

U.S. Appl. No. 12/471,909, filed May 26, 2009 in the name of Tomoyuki Sasaki.
U.S. Appl. No. 12/608,583, filed Oct. 29, 2009 in the name of Tomoyuki Sasaki.
U.S. Appl. No. 12/471,995, filed May 26, 2009 in the name of Tomoyuki Sasaki.

(Continued)

*Primary Examiner* — Kevin Bernatz
(74) *Attorney, Agent, or Firm* — Oliff PLC

(57) ABSTRACT

A magnetic sensor comprises a nonmagnetic conductive layer, a free magnetization layer disposed on a first part of the nonmagnetic conductive layer, a fixed magnetization layer disposed on a second part of the nonmagnetic conductive layer different from the first part, upper and lower first magnetic shield layers opposing each other through the nonmagnetic conductive layer and free magnetization layer interposed therebetween, upper and lower second magnetic shield layers opposing each other through the nonmagnetic conductive layer and fixed magnetization layer interposed therebetween, a first electrically insulating layer disposed between the lower second magnetic shield layer and nonmagnetic conductive layer, and a first electrode layer for electrically connecting the lower second magnetic shield layer and nonmagnetic conductive layer to each other, while the fixed magnetization layer and first electrode layer oppose each other through the nonmagnetic conductive layer.

14 Claims, 6 Drawing Sheets

(56) References Cited

FOREIGN PATENT DOCUMENTS

| | | |
|---|---|---|
| JP | A-2005-209248 | 8/2005 |
| JP | A-2007-88068 | 4/2007 |
| JP | A-2007-157252 | 6/2007 |
| JP | A-2007-294710 | 11/2007 |
| JP | A-2007-299467 | 11/2007 |
| JP | B2-4029772 | 1/2008 |
| JP | A-2009-146512 | 7/2009 |

OTHER PUBLICATIONS

Sep. 30, 2011 Office Action issued in U.S. Appl. No. 12/471,995.
Oct. 11, 2011 Notice of Allowance issued in U.S. Appl. No. 12/608,583.
Apr. 20, 2012 Office Action issued in U.S. Appl. No. 12/471,909.
Feb. 7, 2012 Office Action issued in U.S. Appl. No. 12/471,995.
May 28, 2013 Translation of Office Action issued in Japanese Patent Application No. 2008-284307.

* cited by examiner

MAGNETIC SENSOR

BACKGROUND OF THE INVENTION

1. Field of the Invention

The present invention relates to a magnetic sensor.

2. Related Background Art

As magnetic sensors used in thin-film magnetic recording and reproducing heads and the like, magnetoresistive (M) devices have conventionally been known. In general, the MR devices cause a current to flow between a fixed magnetization layer and a free magnetization layer and thus attain high outputs. In the MR devices, however, domain wall movements due to spin torques given by the current and the like yield signals unnecessary for the magnetic sensors.

On the other hand, a spin accumulation (SA) magnetic sensor in which a free magnetization layer and a fixed magnetization layer are formed on the same horizontal surface (nonmagnetic conductive layer for accumulating spins) has been known (see, for example, Japanese Patent Application Laid-Open No. 2007-299467 and Japanese Patent Publication No. 4029772). When a spin accumulation magnetic sensor is used for a thin-film magnetic recording and reproducing head, for example, it is unnecessary for a current to flow through a free magnetization layer which senses external magnetic fields of a magnetic recording medium and the like. Hence, the spin accumulation magnetic sensor can detect a magnetic state as an output voltage by utilizing a spin current alone. Therefore, the spin accumulation magnetic sensor is less likely to observe unnecessary signals which are seen in the M devices.

SUMMARY OF THE INVENTION

FIG. 5 illustrates an example of conventional spin accumulation magnetic sensors. In the conventional spin accumulation magnetic sensor 50 illustrated in FIG. 5, a free magnetization layer 6 and a fixed magnetization layer 7 are disposed on a nonmagnetic conductive layer 5, while an antiferromagnetic layer 8 and a second electrode layer 9 are disposed on the fixed magnetization layer 7 in this order. The second electrode layer 9 is held between an electrically insulating layers 13, while an upper first magnetic shield layer 11 and a lower first magnetic shield layer 1 are disposed so as to oppose each other through the nonmagnetic conductive layer 5 and free magnetization layer 6 interposed therebetween. Further, an upper second magnetic shield layer 12 is disposed on the second electrode layer 9, while an electrically insulating layer 3 and a first electrode layer 4 are disposed between the lower first magnetic shield layer 1 and nonmagnetic conductive layer 5.

In the conventional spin accumulation magnetic sensor 50, as illustrated in FIG. 5, the first electrode layer 4 is disposed on the first magnetic shield layer 1 on the side opposite from the position where the free magnetization layer 6 is placed with respect to the position where the fixed magnetization layer 7 is provided. Hence, the first electrode layer 4 is disposed at a position separated from the fixed magnetization layer 7 by the nonmagnetic conductive layer 5.

FIG. 6 illustrates an enlarged view of an area 60 in FIG. 5. Applying a detection current I from the fixed magnetization layer 7 to the first electrode layer 4 in the conventional spin accumulation magnetic sensor injects the largest number of spins Sp into the area A on the side opposite from the free magnetization layer 6 in areas of the nonmagnetic conductive layer 5 which oppose the fixed magnetization layer 7. This has been problematic in that the spins Sp are hard to diffuse toward the free magnetization layer 6, thereby deteriorating the output efficiency of the magnetic sensor.

In view of the circumstances mentioned above, it is an object of the present invention to provide a magnetic sensor which can improve the output efficiency by making it easier to inject spin flows into the free magnetization layer.

For achieving the above-mentioned object, the magnetic sensor of the present invention comprises a nonmagnetic conductive layer, a free magnetization layer disposed on a first part of the nonmagnetic conductive layer, a fixed magnetization layer disposed on a second part of the nonmagnetic conductive layer different from the first part, upper and lower first magnetic shield layers opposing each other through the nonmagnetic conductive layer and free magnetization layer interposed therebetween, upper and lower second magnetic shield layers opposing each other through the nomnagnetic conductive layer and fixed magnetization layer interposed therebetween, a first electrically insulating layer disposed between the lower second magnetic shield layer and nonmagnetic conductive layer, and a first electrode layer for electrically connecting the lower second magnetic shield layer and nonmagnetic conductive layer to each other, while the fixed magnetization layer and first electrode layer oppose each other through the nonmagnetic conductive layer.

This makes it easier for spin flows to be injected more into the area where the fixed magnetization layer and first electrode layer oppose each other in the nonmagnetic conductive layer when a current flows from the fixed magnetization layer to the first electrode layer through the nonmagnetic conductive layer. As a result, a greater number of spins can be injected at positions near the free magnetization layer in the nonmagnetic conductive layer, so that the diffusion length of the injected spins becomes shorter than that in the conventional magnetic sensor. Therefore, the spins are easier to diffuse toward the free magnetization layer, whereby the output efficiency can be made higher than that in the conventional magnetic sensor.

Preferably, in the magnetic sensor of the present invention, the first electrode layer opposes a part of the fixed magnetization layer on the free magnetization layer side.

This makes it easier to inject spin flows into a part on the free magnetization layer side in particular in the area of the nonmagnetic conductive layer where the fixed magnetization layer and first electrode layer oppose each other in the nonmagnetic conductive layer when a current flows from the fixed magnetization layer to the first electrode layer through the nonmagnetic conductive layer. As a result, the spin flows are more likely to diffuse toward the free magnetization layer, whereby the output efficiency can be improved more effectively than in the conventional magnetic sensor.

Preferably, in the magnetic sensor of the present invention, the nonmagnetic conductive layer and first electrode layer are formed from the same material, while the nonmagnetic conductive layer and first electrode layer have a total thickness greater than a distance from the fixed magnetization layer to the free magnetization layer.

This makes the spin flows harder to flow out to the first electrode layer but easier to be injected toward the free magnetization layer, whereby the output efficiency of the magnetic sensor can be improved more effectively.

Preferably, in the magnetic sensor of the present invention, the lower first magnetic shield layer is placed closer to the nonmagnetic conductive layer than is the lower second magnetic shield layer.

This can reduce the gap between the upper and lower first magnetic shield layers sandwiching the free magnetization layer, thereby improving the resolution of the magnetic sensor.

Preferably, the magnetic sensor of the present invention further comprises a second electrically insulating layer between the lower first magnetic shield layer and nonmagnetic conductive layer, while the lower first and second magnetic shield layers are in contact with each other.

This allows the lower first and second magnetic shield layers to be formed integrally with each other, thereby facilitating the manufacture. Since the second electrically insulating layer is disposed between the lower first magnetic shield layer and nonmagnetic conductive layer, the spin flows can be inhibited from flowing out from the nonmagnetic conductive layer to the lower first magnetic shield layer.

Preferably, in the magnetic sensor of the present invention, the lower first and second magnetic shield layers are disposed independently from each other.

This allows the lower first magnetic shield layer to be used as an electrode for measuring a voltage occurring at an interface between the free magnetization layer and nonmagnetic conductive layer, and the lower second magnetic shield layer as an electrode for injecting spins into the nonmagnetic conductive layer.

Preferably, the magnetic sensor of the present invention further comprises a permanent magnet for applying a bias magnetic field to the free magnetization layer.

This regulates the magnetic anisotropy of the free magnetization layer, so that the domain structure of the free magnetization layer becomes unified and stabilized, whereby Barkhausen noise can be restrained from being caused by domain wall movements.

Preferably, in the magnetic sensor of the present invention, the fixed magnetization layer has a direction of magnetization fixed by at least one of an antiferromagnetic layer disposed on the fixed magnetization layer and a shape anisotropy of the fixed magnetization layer.

When fixed by an antiferromagnetic layer disposed on the fixed magnetization layer or a shape anisotropy of the fixed magnetization layer, the direction of magnetization of the fixed magnetization layer is easily made less susceptible to external magnetic fields.

Preferably, in the magnetic sensor of the present invention, the fixed magnetization layer has a coercive force greater than that of the free magnetization layer.

This can favorably materialize the fixed magnetization layer and free magnetization layer in the magnetic sensor.

Preferably, in the magnetic sensor of the present invention, the free magnetization layer is arranged on a side where a magnetic flux enters the nonmagnetic conductive layer, while the fixed magnetization layer is arranged on a side opposite from the side where the magnetic flux enters the nonmagnetic conductive layer.

In this case, when the free magnetization layer arranged on the side opposite from the fixed magnetization layer is placed closer to a magnetic recording medium, magnetic information of the recording medium can be detected and reproduced.

Preferably, in the magnetic sensor of the present invention, the free magnetization layer is made of a metal selected from the group consisting of B, V, Cr, Mn, Co, Fe, and Ni, an alloy containing at least one metal in the group, or an alloy containing at least one metal selected from the group and at least one of B, C, and N.

These materials are soft magnetic materials and thus can favorably actualize the free magnetization layer in the magnetic sensor.

Preferably, in the magnetic sensor of the present invention, the fixed magnetization layer is made of a metal selected from the group consisting of B, V, Cr, Mn, Co, Fe, and Ni, an alloy containing at least one metal in the group, or an alloy containing at least one metal selected from the group and at least one of B, C, and N.

These materials are ferromagnetic materials having high spin polarizabilities and thus can favorably actualize the fixed magnetization layer in the magnetic sensor.

Preferably, in the magnetic sensor of the present invention, the nonmagnetic conductive layer is made of a material containing at least one element selected from the group consisting of B, C, Mg, Al, Ag, and Cu.

These materials have long spin-diffusion lengths and relatively low electric conductivities and thus can favorably actualize a spin accumulation layer.

It will also be preferred in the magnetic sensor of the present invention if the nonmagnetic conductive layer is made of a semiconductor compound containing Si or ZnO.

These semiconductor compounds have further longer spin-diffusion lengths and thus are more preferred as the spin accumulation layer, while being able to yield an output higher than that of the nonmagnetic conductive layer using the above-mentioned metals and alloys.

The present invention can provide a magnetic sensor which can improve the output efficiency by making it easier to inject spin flows into the free magnetization layer.

DESCRIPTION OF THE PREFERRED EMBODIMENTS

Figure 1:
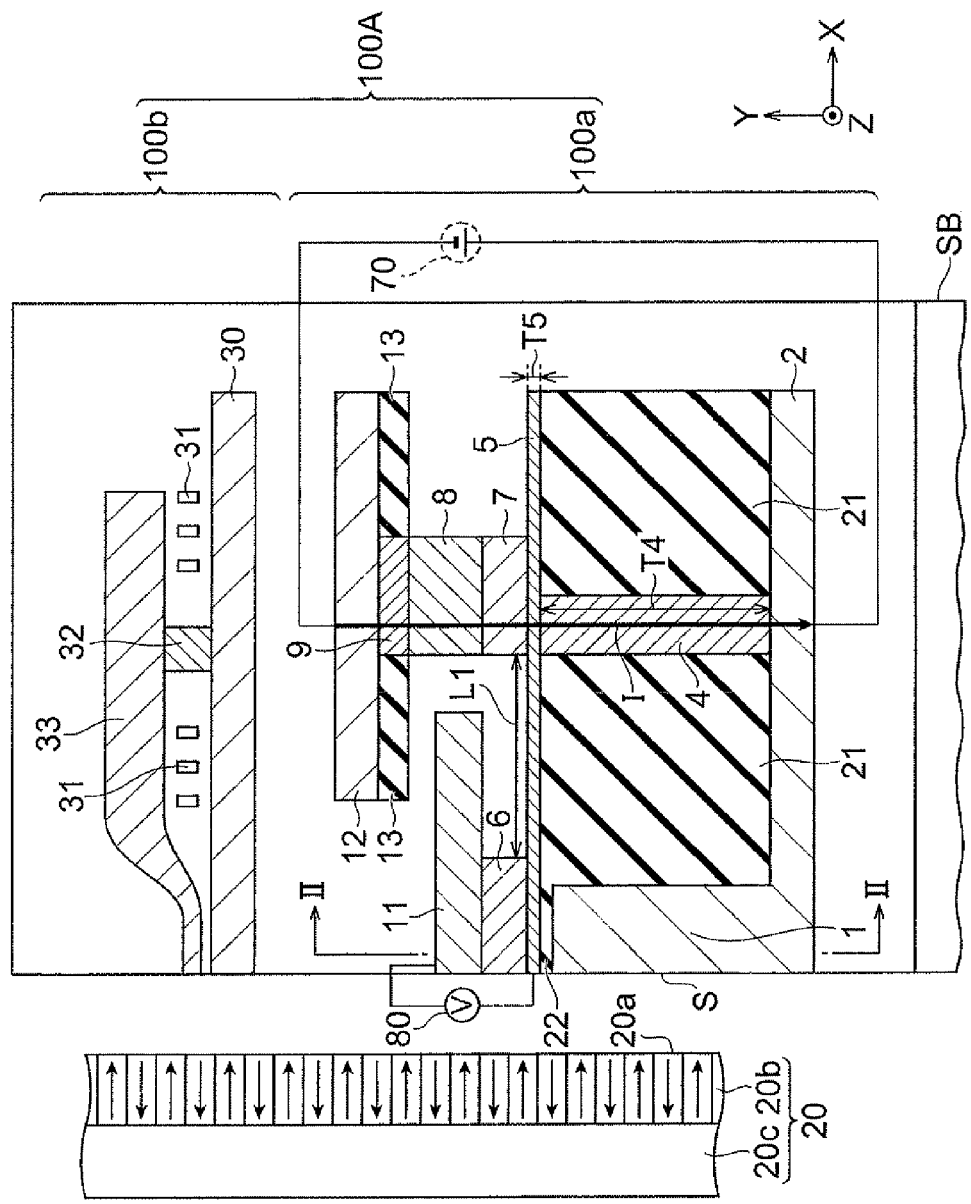
FIG. 1 is a schematic view for explaining a thin-film magnetic recording and reproducing head 100A equipped with a magnetic sensor 100a and operations thereof.

In the following, embodiments of the present invention will be explained in detail with reference to the accompanying drawings. In the explanation of the drawings, the same constituents will be referred to with the same signs while omitting their overlapping descriptions. Ratios of dimensions in the drawings do not always coincide with those in practice.

(First Embodiment)

A thin-film magnetic recording and reproducing head 100A will now be explained as an example of the magnetic sensor in accordance with the first embodiment.

FIG. 1 is a partial sectional view illustrating the thin-film magnetic recording and reproducing head 100A.

The thin-film magnetic recording and reproducing head 100A carries out operations for recording and reading magnetic information at such a position that its air bearing surface (ABS) S opposes a recording surface 20a of a magnetic recording medium 20.

The magnetic recording medium 20, which includes a recording layer 20b having the recording surface 20a and a soft magnetic backing layer 20c laminated on the recording layer 20b, advances in the direction of Y in the drawing relative to the thin-film magnetic recording and reproducing head 100A.

The thin-film magnetic recording and reproducing head 100A comprises a magnetic sensor 100a for reading records from the magnetic recording medium 20 and a magnetic recording part 100b for recording onto the magnetic recording medium 20. The magnetic sensor 100a and magnetic recording part 100b are disposed on a substrate SB and covered with a nonmagnetic insulating layer made of alumina or the like.

As illustrated in FIG. 1, the magnetic recording part 100b is disposed on the magnetic sensor 100a. In the magnetic recording part 100b, a contact part 32 and a main magnetic pole 33 are provided on a return yoke 30, so as to form a magnetic flux path. A thin-film coil 31 is provided so as to surround the contact part 32. When a recording current is caused to flow through the thin-film coil 31, a magnetic flux is released from the leading end of the main magnetic pole 33, whereby information can be recorded on the recording layer 20b of the magnetic recording medium 20 such as a hard disk.

The magnetic sensor 100a mainly comprises a nonmagnetic conductive layer 5 for accumulating spins of electrons, a free magnetization layer 6 disposed on a first part of the nonmagnetic conductive layer 5, a fixed magnetization layer 7 disposed on a second part of the nonmagnetic conductive layer 5 different from the first part, an upper first magnetic shield layer 11 and a lower first magnetic shield layer 1 which oppose each other while holding the nonmagnetic conductive layer 5 and free magnetization layer 6 therebetween, an upper second magnetic shield layer 12 and a lower second magnetic shield layer 2 which oppose each other while holding the nonmagnetic conductive layer 5 and fixed magnetization layer 7 therebetween, a first electrically insulating layer 21 disposed between the lower second magnetic shield layer 2 and nonmagnetic conductive layer 5, and a first electrode layer 4 for electrically connecting the lower second magnetic shield layer 2 and nonmagnetic conductive layer 5 to each other.

The nonmagnetic conductive layer 5, which is a layer accumulating spins by spin injections, is disposed on a plane formed by the first electrode layer 4, the first electrically insulating layer 21, and a second electrically insulating layer 22. A nonferromagnetic conductive material is used for making the nonmagnetic conductive layer 5. As a material for the nonmagnetic conductive layer 5, one having a long spin-diffusion length and a relatively low electric conductivity is preferably selected.

An example of the material for the nonmagnetic conductive layer 5 contains at least one element selected from the group consisting of B, C, Mg, Ag, Al, and Cu. Specific examples include Cu and Al. Other examples of the material for the nonmagnetic conductive layer 5 include semiconductor compounds such as Si, ZnO, and GaAs. Since these semiconductor compounds have further longer spin-diffusion lengths and relatively low electric conductivities, the nonmagnetic conductive layer 5 using these semiconductor compounds is more favorable as a spin accumulation layer and can yield an output higher than that of the nonmagnetic conductive layer 5 using the above-mentioned metals and their alloys.

The free magnetization layer 6 is a layer for detecting an external magnetic field and sharply sensing a change in the direction of magnetization of the magnetic recording medium 20 and the like. The free magnetization layer 6 is arranged on the upper face of the nonmagnetic conductive layer 5 on a side where the magnetic flux enters the nonmagnetic conductive layer 5, i.e., on the air bearing surface S side. When the free magnetization layer 6 is placed close to the magnetic recording medium 20, magnetic information can favorably be read from the medium 20. As the free magnetization layer 6, a ferromagnetic material, such as a soft magnetic material in particular, is employed, examples of which include metals selected from the group consisting of B, V, Cr, Mo, Co, Fe, and Ni, alloys containing at least one of the metals in the above-mentioned group, and alloys containing at least one metal selected from the above-mentioned group and at least one of B, C, and N. Specific examples include CoFeB and NiFe.

The fixed magnetization layer 7 is a layer for injecting electrons having predetermined spins into the nonmagnetic conductive layer 5. The fixed magnetization layer 7 is arranged on the upper face of the nonmagnetic conductive layer 5 on a side opposite from the side where the magnetic flux enters the nonmagnetic conductive layer 5, i.e., on the side remote from the air bearing surface S. As a material for the fixed magnetization layer 7, a ferromagnetic metal material having a high spin polarizability can be used, examples of which include metals selected from the group consisting of B, V, Cr, Mn, Co, Fe, and Ni, alloys containing at least one element in the above-mentioned group, and alloys containing at least one element selected from the above-mentioned group and at least one element selected from the group consisting of B, C, and N. Specific examples include CoFe and FeMn.

The fixed magnetization layer 7 has a coercive force greater than that of the free magnetization layer 6. Preferably, the magnetization of the fixed magnetization layer 7 is fixed by at least one of a magnetization fixing method using an antiferromagnetic layer 8 which will be explained later and a magnetization fixing method based on the shape anisotropy of the fixed magnetization layer 7. This can make the direction of magnetization of the fixed magnetization layer 7 less susceptible to external magnetic fields.

When the magnetization fixing method using the antiferromagnetic layer 8 is employed as a method of fixing the magnetization of the fixed magnetization layer 7, the antiferromagnetic layer 8 is disposed on the fixed magnetization layer 7. When the antiferromagnetic layer 8 is exchange-coupled with the fixed magnetization layer 7, the direction of magnetization of the fixed magnetization layer 7 can be fixed (provided with a unidirectional anisotropy). This allows the fixed magnetization layer 7 to have a higher coercive force in one direction than when there is no antiferromagnetic layer 8. Therefore, the material used in the antiferromagnetic layer 8 is selected according to the material used in the fixed magnetization layer 7. Examples of the material for the antiferromagnetic layer 8 include alloys exhibiting antiferromagnetism which use Mn, specific examples of which include alloys containing Mn and at least one element selected from the group consisting of Pt, Ir, Fe, Ru, Cr, Pd, and Ni. More specific examples include IrMn and PtMn.

Figure 2A:
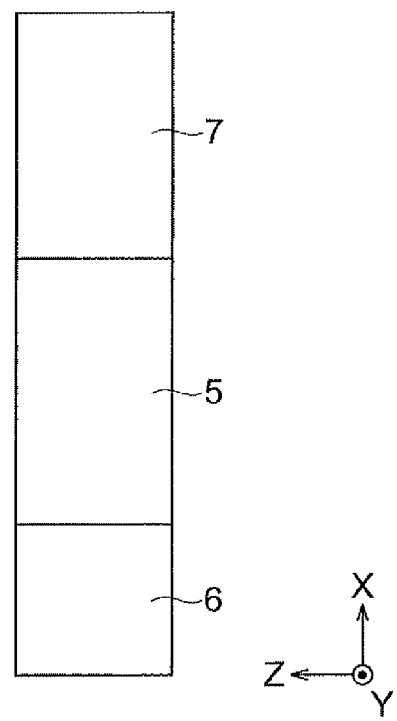
FIG. 2A is a schematic view illustrating a fixed magnetization layer, a free magnetization layer, and a nonmagnetic conductive layer when seen from the Y direction.

On the other hand, the antiferromagnetic layer 8 can be omitted when employing a method of fixing the magnetization of the fixed magnetization layer 7 by imparting a shape anisotropy thereto. For example, as shown in FIG. 2A, the fixed magnetization layer 7 may be shaped into a rectangular form having a longer axis in the X direction when seen from the Y direction. The magnetization may be fixed by both of the antiferromagnetic layer 8 and the shape anisotropy as a matter of course.

The second electrode layer 9 is a layer for electrically connecting the upper second magnetic shield layer 12 and the antiferromagnetic layer 8 to each other in order for the upper second magnetic shield layer 12 to serve as an electrode such that a current flows into the fixed magnetization layer 7. When there is no antiferromagnetic layer 8, the second electrode layer 9 comes into contact with the fixed magnetization layer 7. The second electrode layer 9 is also effective in suppressing the atomic diffusion between the upper second magnetic shield layer 12 and the antiferromagnetic layer 8 or fixed magnetization layer 7 and the like. The present invention can also be carried out when the upper second magnetic shield layer 12 is in contact with the antiferromagnetic layer 8 or fixed magnetization layer 7 without the second electrode layer 9. Examples of the material for the second electrode layer 9 include metal materials such as Cr and Al.

The upper first magnetic shield layer 11 and upper second magnetic shield layer 12 constitute an upper magnetic shield layer and respectively block magnetisms from invading the free magnetization layer 6 and fixed magnetization layer 7 from the outside, from above the magnetic sensor 100a in particular. The upper first magnetic shield layer 11 is arranged closer to the nonmagnetic conductive layer 5 than is the upper second magnetic shield layer 12. This can reduce the gap between the free magnetization layer 6 and upper first magnetic shield layer 11 and thus can improve the resolution of the magnetic sensor. Also, the upper first magnetic shield layer 11 is in contact with the free magnetization layer 6. This can further reduce the gap between the free magnetization layer 6 and upper first magnetic shield layer 11 and thus can further improve the resolution of the magnetic sensor.

As for the fixed magnetization layer 7, the gap between the nonmagnetic conductive layer 5 and upper second magnetic shield layer 12 tends to become greater because of the antiferromagnetic layer 8, the second electrode layer 9, and the like. However, placing the upper first magnetic shield layer 11 closer to the nonmagnetic conductive layer 5 than is the upper second magnetic shield layer 12 can make it easier to narrow the gap between the upper first magnetic shield layer 11 and lower first magnetic shield layer 1 in the free magnetization layer 6.

As illustrated in FIG. 1, the upper first magnetic shield layer 11 is formed on the free magnetization layer 6. On the other hand, the upper second magnetic shield layer 12 is formed on a layer structure constituted by the fixed magnetization layer 7, antiferromagnetic layer 8, and second electrode layer 9.

In this embodiment, the upper first magnetic shield layer 11 and upper second magnetic shield layer 12 are disposed independently and separately from each other. This makes it possible to use the upper first magnetic shield layer 11 as an electrode for measuring a voltage occurring at the interface between the nonmagnetic conductive layer 5 and free magnetization layer 6, and the upper second magnetic shield layer 12 as an electrode for injecting spins into the nonmagnetic conductive layer 5.

The lower first magnetic shield layer 1 and lower second magnetic shield layer 2 constitute a lower magnetic shield layer and are used for respectively blocking magnetisms from invading the free magnetization layer 6 and fixed magnetization layer 7 from the outside, from under the magnetic sensor 100a in particular. In this embodiment, the lower first magnetic shield layer 1 and lower second magnetic shield layer 2 are integrally formed in contact with each other and electrically connected to each other, and thus are easy to manufacture.

The lower first magnetic shield layer 1 opposes the free magnetization layer 6 through the second electrically insulating layer 22, which will be explained later, and projects toward the nonmagnetic conductive layer 5 so as to be positioned closer to the nonmagnetic conductive layer 5 than is the lower second magnetic shield layer 2 opposing the fixed magnetization layer 7. Consequently, the gap between the free magnetization layer 6 and lower first magnetic shield layer 1 can be made smaller than that in the conventional magnetic sensor, whereby the gap between the upper first magnetic shield layer 11 and lower first magnetic shield layer 1 can be reduced. This can narrow the gap between the upper first magnetic shield layer 11 and lower first magnetic shield layer 1 where the free magnetization layer 6 is held, which is an indication of resolution, thereby improving the resolution of the magnetic sensor.

Examples of materials for the lower first magnetic shield layer 1, lower second magnetic shield layer 2, upper first magnetic shield layer 1, and upper second magnetic shield layer 12 include soft magnetic materials such as alloys containing Ni and Fe, sendust, alloys containing Fe and Co, and alloys containing Fe, Co, and Ni.

The first electrically insulating layer 21 is disposed between the nonmagnetic conductive layer 5 and lower second magnetic shield layer 2. The first electrically insulating layer 21 is used for preventing spins of electrons accumulated in the nonmagnetic conductive layer 5 from flowing out toward the lower second magnetic shield layer 2. From the viewpoint of efficiently accumulating spins, the first electrically insulating layer 21 is disposed on the lower face of the nonmagnetic conductive layer 5 so as to extend from the fixed magnetization layer 7 side to the free magnetization layer 6 side.

Since the second electrically insulating layer 22 is disposed between the lower first magnetic shield layer 1 and nonmagnetic conductive layer 5, the lower first magnetic shield layer 1 is not in contact with the nonmagnetic conductive layer 5. This can prevent spin flows from flowing out to the lower first magnetic shield layer 1 from the nonmagnetic conductive layer 5 opposing the free magnetization layer 6. An example of materials for the first electrically insulating layer 21 and second electrically insulating layer 22 is $SiO_2$.

The first electrode layer 4 is an electrode for causing a detection current to flow into the fixed magnetization layer 7. In FIG. 1, the nonmagnetic conductive layer 5 is electrically connected to the lower second magnetic shield layer 2 through the first electrode layer 4. Therefore, the lower second magnetic shield layer 2 disposed under the first electrode layer 4 can be used as an electrode for causing the detection current to flow into the fixed magnetization layer 7.

The first electrode layer 4 is disposed at a position opposing the fixed magnetization layer 7 through the nonmagnetic conductive layer 5. Preferably, the first electrode layer 4 opposes a part of the area under the fixed magnetization layer 7 which is as close to the free magnetization layer 6 as possible.

When seen from the Y direction of FIG. 1, the outline of the first electrode layer 4 falls within an area not protruding from the outline of the fixed magnetization layer 7. FIG. 1 illustrates an example in which one end on the free magnetization layer 6 side of the first electrode layer 4 (the left part of the first electrode layer 4 illustrated in FIG. 1) and one end on the free magnetization layer 6 side of the fixed magnetization layer 7 (the left part of the fixed magnetization layer 7 illustrated in FIG. 1) are located at the same position in the X direction. From the viewpoint of restraining the S/N ratio from being lowered by the current noise, it is desirable for one end on the free magnetization layer 6 side of the fixed magnetization layer 7 and one end on the free magnetization layer 6 side of the first electrode layer 4 to be placed at the same position in the X direction. However, the present invention can also be carried out when one end on the free magnetization layer 6 side of the fixed magnetization layer 7 is shifted from one end on the free magnetization layer 6 side of the first electrode layer 4 toward the free magnetization layer 6.

When the first electrode layer 4 and nonmagnetic conductive layer 5 are formed from the same material, it will be preferred if the sum of the thickness T4 of the first electrode layer 4 and the thickness T5 of the nonmagnetic conductive layer 5 is greater than the distance L1 from the fixed magnetization layer 7 to the free magnetization layer 6.

As the first electrode layer 4, a material containing at least one element selected from the group consisting of B, C, Mg, Al, Ag, and Cu can be used, for example. Also employable as the first electrode layer 4 are semiconductor compounds such as Si and ZnO. Preferably, the first electrode layer 4 and nonmagnetic conductive layer 5 are made of the same material.

The third electrically insulating layer 13 is formed at both ends of the second electrode layer 9. The third electrically insulating layer 13 is made of $SiO_2$, for example. The third electrically insulating layer 13 can be omitted.

Figure 2B:
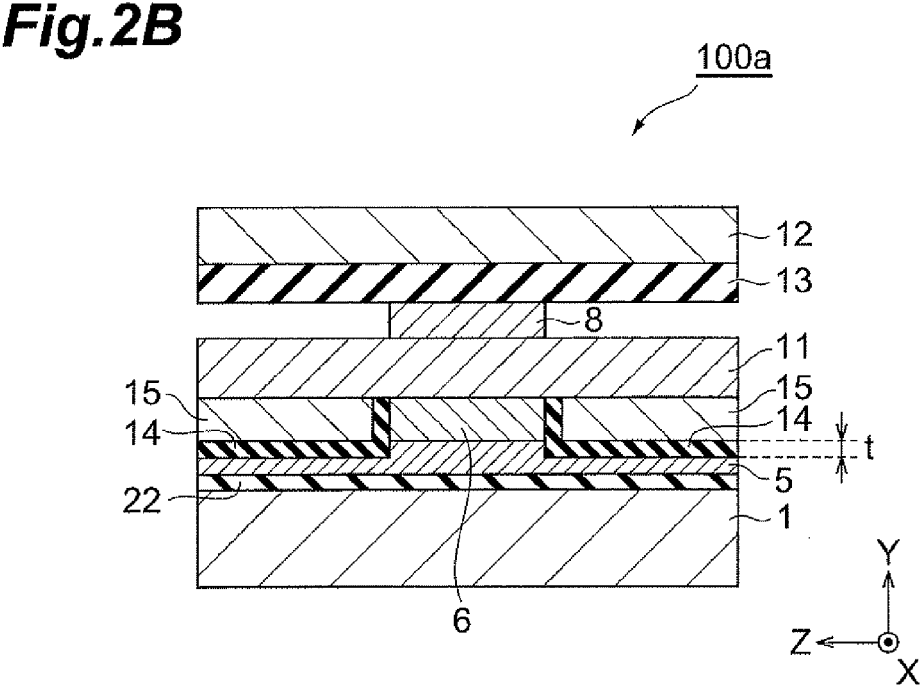
FIG. 2B is a schematic view for explaining a cross-sectional structure taken along the line II-II of FIG. 1.

A cross-sectional form of the magnetic sensor 100a parallel to the Z direction illustrated in FIG. 1 will now be explained with reference to FIG. 1. FIG. 2B is a schematic view for explaining a cross-sectional structure taken along the line II-II of FIG. 1.

Preferably, as illustrated in FIG. 2B, the part of the nonmagnetic conductive layer 5 disposed directly under the free magnetization layer 6 is thicker than the rest of the nonmagnetic conductive layer 5 by the thickness t of a fourth electrically insulating layer 14 which will be explained later. This is for the free magnetization layer 6 and a permanent magnet 15, which will be explained later, to have the same thickness, whereby the domain structure of the free magnetization layer 6 can be stabilized more uniformly.

The second electrically insulating layer 22 is disposed between the lower first magnetic shield layer 1 and free magnetization layer 6. The fourth electrically insulating layer 14 is disposed between the permanent magnet 15 and the nonmagnetic conductive layer 5 and free magnetization layer 6 and used for insulating the nonmagnetic conductive layer 5 and free magnetization layer 6 from the permanent magnet 15. $SiO_2$ or the like is used as the fourth electrically insulating layer 14.

The permanent magnet 15 is arranged on both sides of the free magnetization layer 6 with the fourth electrically insulating layer 14 interposed therebetween. Applying a bias magnetic field to the free magnetization layer 6 by using a leakage magnetic flux from the permanent magnet 15 can stabilize (uniaxially orient) the domain structure of the free magnetization layer 6. This can restrain Barkhausen noise from being caused by domain wall movements.

Figure 3:
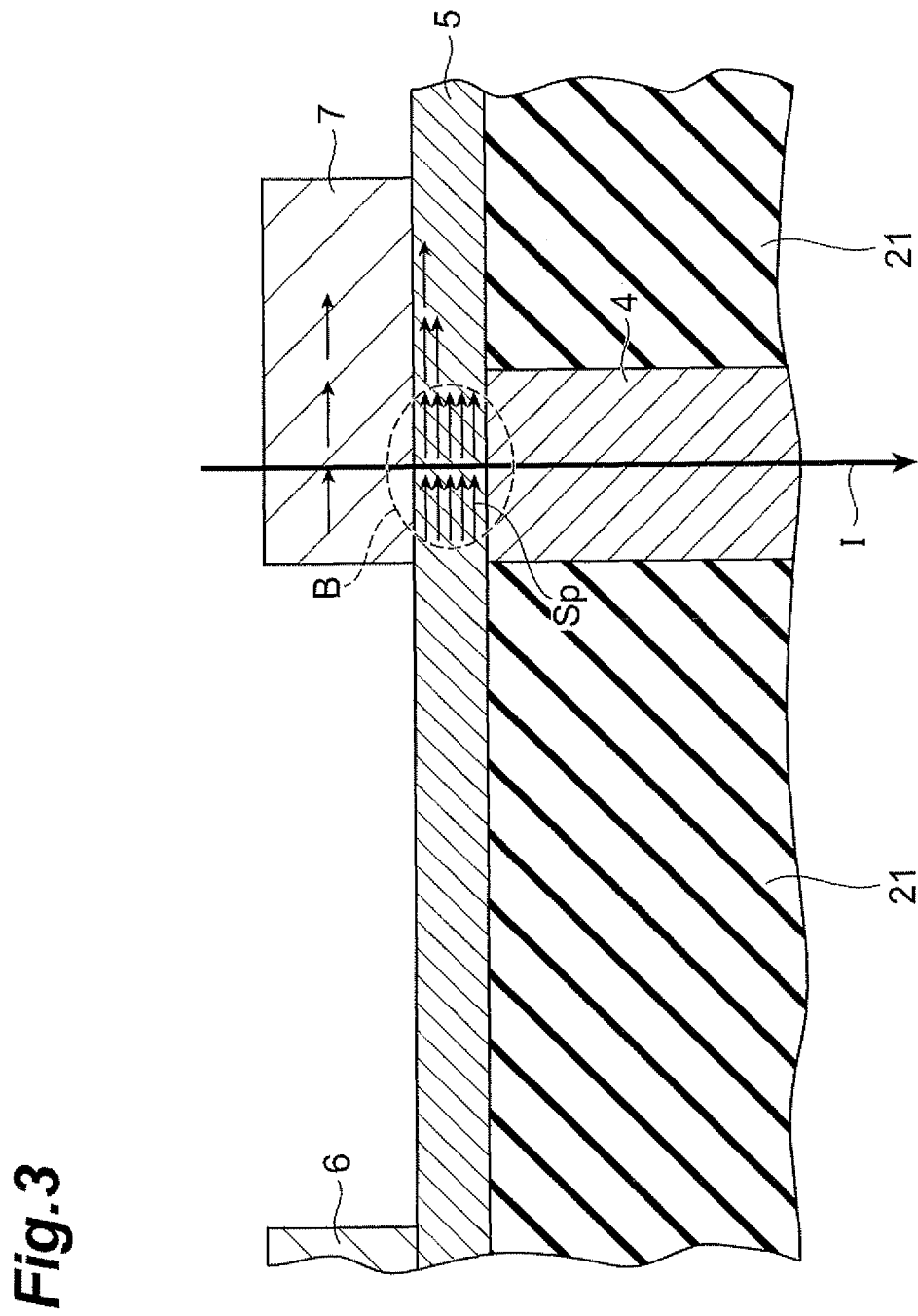
FIG. 3 is an enlarged view of an area where a first electrode layer 4 and a fixed magnetization layer 7 oppose each other.

Operations and effects of the magnetic sensor 100a in accordance with the first embodiment will now be explained with reference to FIGS. 1 and 3. FIG. 3 is a view enlarging the area where the first electrode layer 4 and fixed magnetization layer 7 oppose each other in FIG. 1.

As illustrated in FIG. 1, in order for a detection current to flow into the fixed magnetization layer 7, the lower second magnetic shield layer 2 and upper second magnetic shield layer 12 are electrically connected to a current source 70. On the other hand, the nonmagnetic conductive layer 5 and upper magnetic shield layer 11 are electrically connected to a voltmeter 80. When the upper first magnetic shield layer 1 is disposed so as to be separated and insulated from the free magnetization layer 6, the nonmagnetic conductive layer 5 and free magnetization layer 6 may be electrically connected to the voltmeter 80.

First, a detection current I is caused to flow into the fixed magnetization layer 7 of the magnetic sensor 100a. For example, as illustrated in FIG. 1, the current source 70 lets the detection current I to flow through the upper second magnetic shield layer 12, second electrode layer 9, antiferromagnetic layer 8, fixed magnetization layer 7, nonmagnetic conductive layer 5, first electrode layer 4, and lower second magnetic shield layer 2 in this order.

As illustrated in FIG. 3, the detection current I is made to flow from the fixed magnetization layer 7, which is a ferromagnetic body, into the nonmagnetic conductive layer 5. Since the first electrode layer 4 and fixed magnetization layer 7 are disposed so as oppose each other through the nonmagnetic conductive layer 5, a greater number of electrons having spins Sp corresponding to the direction of magnetization of the fixed magnetization layer 7 are likely to be injected into the area B near the free magnetization layer 6 at the interface between the fixed magnetization layer 7 and nonmagnetic conductive layer 5 in this embodiment than in the conventional magnetic sensor. This shortens the diffusion length of the injected spins Sp, thereby making it easier for the spins Sp to diffuse toward the free magnetization layer 6. As a result the output efficiency of the magnetic sensor can be improved.

When the first electrode layer 4 is disposed so as to oppose the part on the free magnetization layer 6 side in the area under the fixed magnetization layer 7, the spin flows can be injected toward the free magnetization layer 6 more effectively. As a result, the output efficiency of the magnetic sensor can further be improved.

In the case where the first electrode layer 4 and nonmagnetic conductive layer 5 are formed from the same material, the spin flows are easier to be injected toward the free magnetization layer 6 when the sum of the thickness T4 of the first electrode layer 4 and the thickness T5 of the nonmagnetic conductive layer 5 is greater than the distance L1 from the fixed magnetization layer 7 to the free magnetization layer 6. This can further improve the output efficiency of the magnetic sensor.

According to the relative angle between the direction of magnetization of the free magnetization layer 6, which varies depending on external magnetic fields, and the direction of magnetization of the fixed magnetization layer 7, a variable voltage output occurs at the interface between the free magnetization layer 6 and nonmagnetic conductive layer 5. The voltage occurring between the nonmagnetic conductive layer 5 and upper first magnetic shield layer 11 is detected in this embodiment. Thus, the magnetic sensor 100a can be employed as an external magnetic field sensor.

(Second Embodiment)

A thin-film magnetic recording and reproducing head 100B as an example of the magnetic sensor in accordance with the second embodiment will now be explained.

Figure 4:
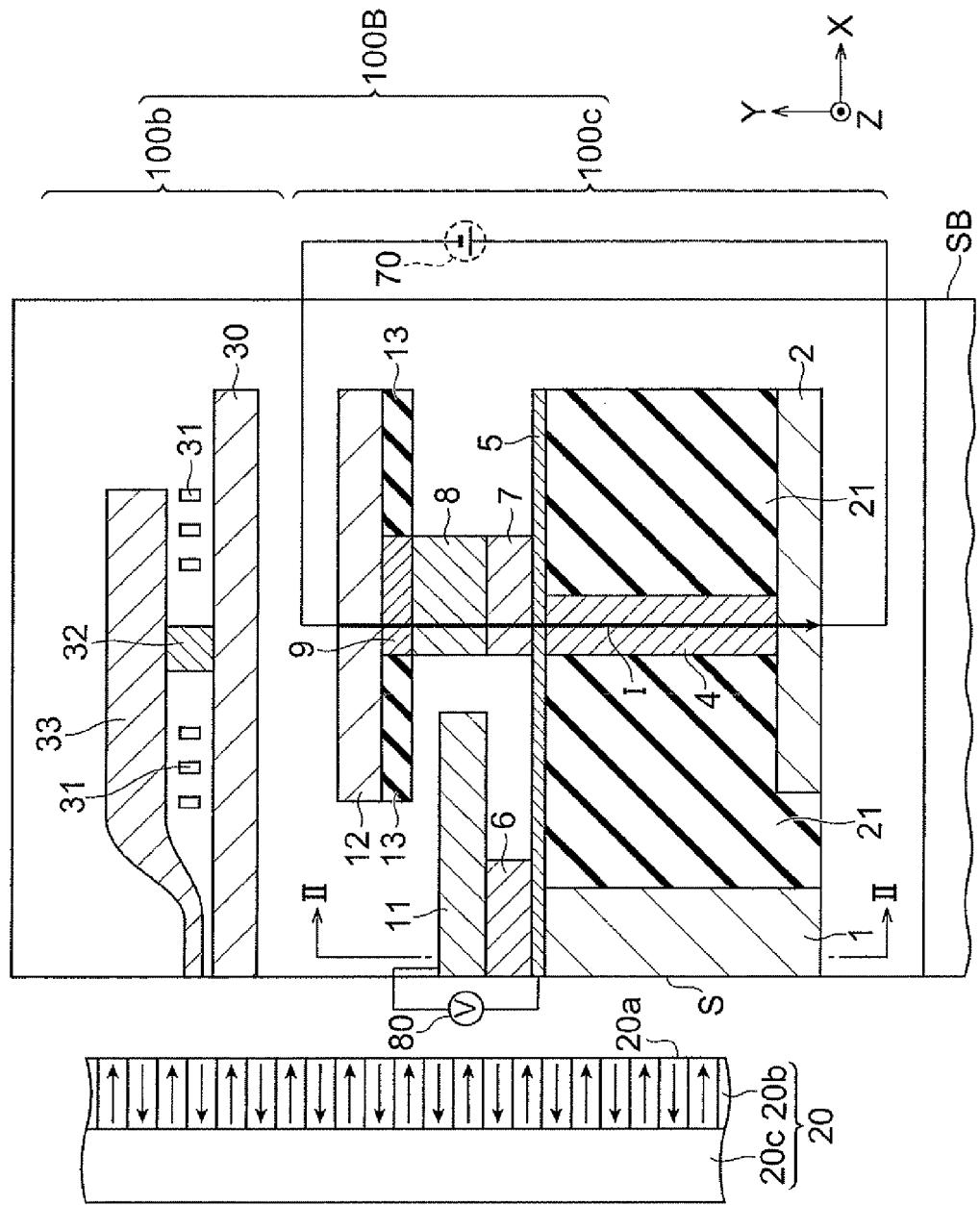
FIG. 4 is a schematic view for explaining a thin-film magnetic recording and reproducing head 100B equipped with a magnetic sensor 100c and operations thereof.
Figure 5:
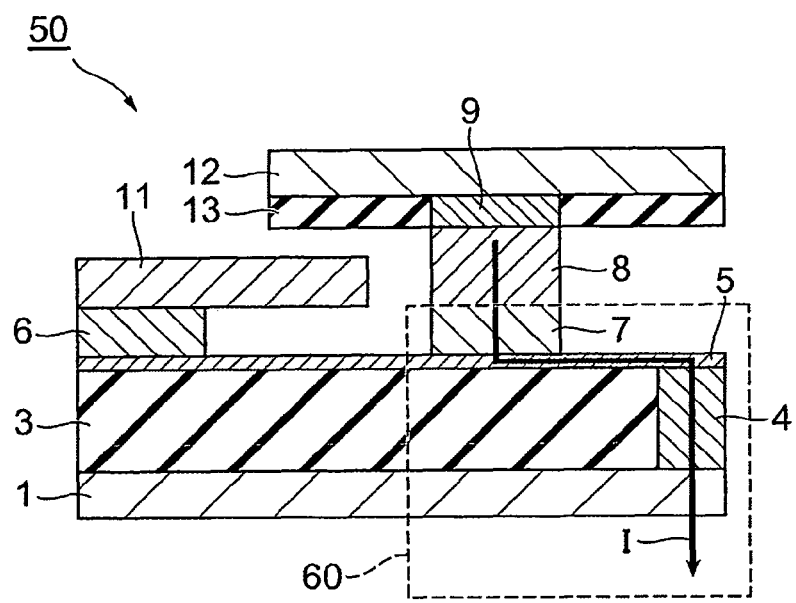
FIG. 5 is a schematic view of the conventional magnetic sensor 50.
Figure 6:
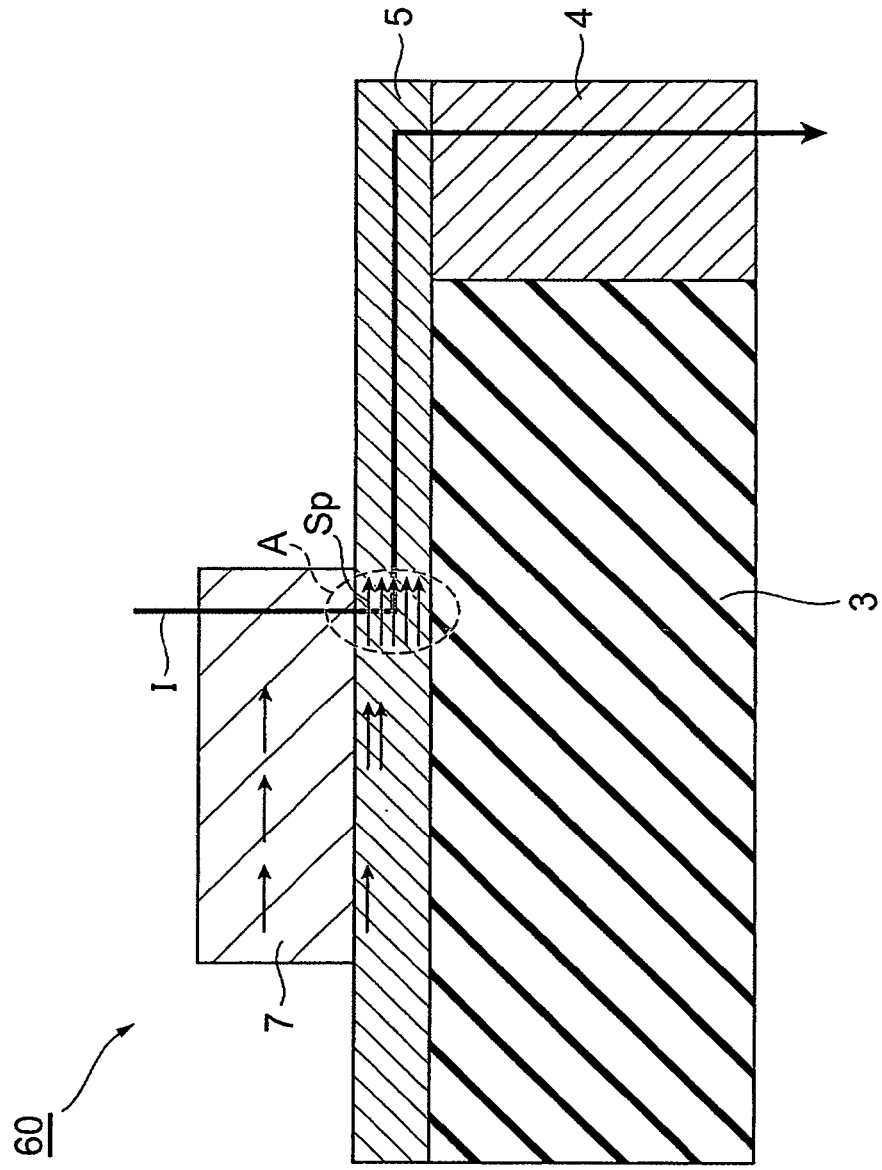
FIG. 6 is an enlarged view of the area 60 of the magnetic sensor 50 illustrated in FIG. 5.

FIG. 4 is a partial sectional view illustrating the thin-film magnetic recording and reproducing head 100B.

The thin-film magnetic recording and reproducing head 100B illustrated in FIG. 4 differs from the thin-film magnetic recording and reproducing head 100A in accordance with the first embodiment in terms of the lower first magnetic shield layer 1, lower second magnetic shield layer 2, first electrically insulating layer 21, and second electrically insulating layer 22 in its magnetic sensor 100c, which will be explained alone.

In this embodiment, the first electrically insulating layer 21 is also disposed between the lower first magnetic shield layer 1 and lower second magnetic shield layer 2, whereby the lower first magnetic shield layer 1 and lower second magnetic shield layer 2 are provided independently and separately from each other. This makes it possible to use the lower first magnetic shield layer 1 as an electrode for measuring a voltage occurring at the interface between the nonmagnetic conductive layer 5 and free magnetization layer 6, and the lower second magnetic shield layer 2 as an electrode for injecting spins into the nonmagnetic conductive layer 5.

Also, as illustrated in FIG. 4, the second electrically insulating layer 22 is omitted, whereby the lower first magnetic shield layer 1 is in contact with the nonmagnetic conductive layer 5. This can further reduce the gap between the free magnetization layer 6 and lower first magnetic shield layer 1 and improve the resolution of the magnetic sensor 100c.

The magnetic sensor 100c in accordance with the second embodiment yields effects similar to those obtained by the magnetic sensor 100a in accordance with the first embodiment.

Though each of the foregoing embodiments explains the magnetic sensor of the present invention by using an example in which it is applied to a thin-film magnetic recording and reproducing head, the magnetic sensor of the present invention is applicable not only to the thin-film magnetic recording and reproducing head, but also to various uses such as magnetic encoder apparatus employed in small robots, digital cameras, and inkjet printers, magnetic field measuring apparatus, and magnetism detecting apparatus, for example.

What is claimed is:

1. A magnetic sensor comprising:
a nonmagnetic conductive layer;
a free magnetization layer disposed on a first part of the nonmagnetic conductive layer;
a fixed magnetization layer disposed on a second part of the nonmagnetic conductive layer different from the first part;
upper and lower first magnetic shield layers opposing each other through the nonmagnetic conductive layer and free magnetization layer interposed therebetween;
upper and lower second magnetic shield layers opposing each other through the nonmagnetic conductive layer and fixed magnetization layer interposed therebetween;
a first electrically insulating layer disposed between the lower second magnetic shield layer and nonmagnetic conductive layer; and
a first electrode layer for electrically connecting the lower second magnetic shield layer and nonmagnetic conductive layer to each other;
wherein the fixed magnetization layer and first electrode layer oppose each other through the nonmagnetic conductive layer;
wherein the first electrode layer overlaps a part of the fixed magnetization layer in a first plane parallel to a bottom surface of the fixed magnetization layer on a free magnetization layer side; and
wherein a part of the first electrically insulating layer overlaps a part of the fixed magnetization layer in a second plane parallel to the bottom of the fixed magnetization layer, on a side opposite from the free magnetization layer side.

2. A magnetic sensor according to claim 1,
wherein the nonmagnetic conductive layer and first electrode layer are formed from the same material; and
wherein the nonmagnetic conductive layer and first electrode layer have a total thickness greater than a distance from the fixed magnetization layer to the free magnetization layer.

3. A magnetic sensor according to claim 1, further comprising a second electrically insulating layer between the lower first magnetic shield layer and nonmagnetic conductive layer;
wherein the lower first and second magnetic shield layers are in contact with each other.

4. A magnetic sensor according to claim 1, wherein the lower first and second magnetic shield layers are disposed independently from each other.

5. A magnetic sensor according to claim 1, further comprising a permanent magnet for applying a bias magnetic field to the free magnetization layer.

6. A magnetic sensor according to claim 1, wherein the fixed magnetization layer has a direction of magnetization fixed by at least one of an antiferromagnetic layer disposed on the fixed magnetization layer and a shape anisotropy of the fixed magnetization layer.

7. A magnetic sensor according to claim 1, wherein the fixed magnetization layer has a coercive force greater than that of the free magnetization layer.

8. A magnetic sensor according to claim 1, wherein the free magnetization layer is arranged on the free magnetization layer side where a magnetic flux enters the nonmagnetic conductive layer; and
wherein the fixed magnetization layer is arranged on the side opposite from the free magnetization layer side where the magnetic flux enters the nonmagnetic conductive layer.

9. A magnetic sensor according to claim 1, wherein the free magnetization layer is made of a metal selected from the group consisting of V, Cr, Mn, Co, Fe, and Ni, an alloy containing at least one metal in the group, or an alloy containing at least one metal selected from the group and at least one of B, C, and N.

10. A magnetic sensor according to claim 1, wherein the fixed magnetization layer is made of a metal selected from the group consisting of V, Cr, Mn, Co, Fe, and Ni, an alloy containing at least one metal in the group, or an alloy containing at least one metal selected from the group and at least one of B, C, and N.

11. A magnetic sensor according to claim 1, wherein the nonmagnetic conductive layer is made of a material containing at least one element selected from the group consisting of B, C, Mg, Al, Ag, and Cu.

12. A magnetic sensor according to claim 1, wherein the nonmagnetic conductive layer is made of a semiconductor compound containing Si or ZnO.

13. A magnetic sensor according to claim 1, wherein, in a cross-sectional view, the first electrode layer is disposed between two portions of the first electrically insulating layer.

14. A magnetic sensor comprising:
a nonmagnetic conductive layer;
a free magnetization layer disposed on a first part of the nonmagnetic conductive layer;
a fixed magnetization layer disposed on a second part of the nonmagnetic conductive layer different from the first part;
upper and lower first magnetic shield layers opposing each other through the nonmagnetic conductive layer and free magnetization layer interposed therebetween;
upper and lower second magnetic shield layers opposing each other through the nonmagnetic conductive layer and fixed magnetization layer interposed therebetween;

a first electrically insulating layer disposed between the lower second magnetic shield layer and nonmagnetic conductive layer; and a first electrode layer for electrically connecting the lower second magnetic shield layer and nonmagnetic conductive layer to each other;

wherein the fixed magnetization layer and first electrode layer oppose each other through the nonmagnetic conductive layer; and wherein the lower first magnetic shield layer is placed closer to the nonmagnetic conductive layer than is the lower second magnetic shield layer.

\* \* \* \* \*